P. SCHMIDT & C. DOBSLAW.
POCKET LAMP FOR FIREARMS.
APPLICATION FILED APR. 23, 1914.
1,262,270. Patented Apr. 9, 1918.
2 SHEETS—SHEET 1.
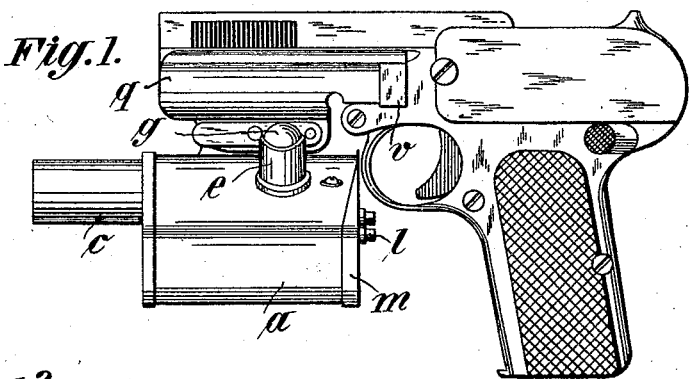

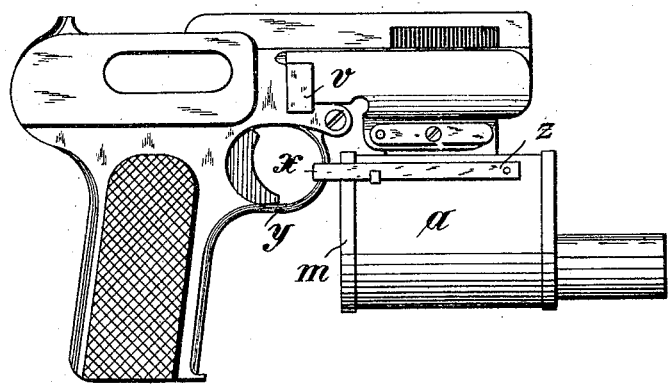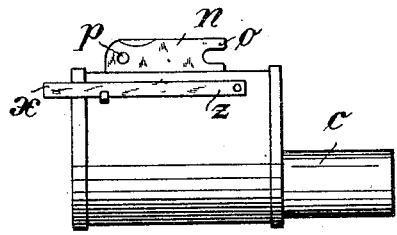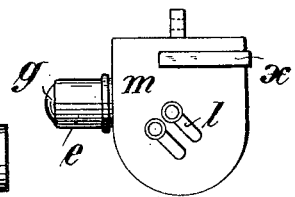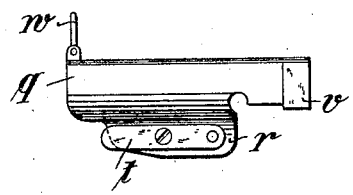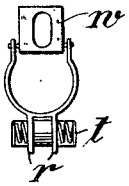

UNITED STATES PATENT OFFICE.

PAUL SCHMIDT AND CARL DOBSLAW, OF BERLIN, GERMANY.

POCKET-LAMP FOR FIREARMS.

1,262,270.      Specification of Letters Patent.      Patented Apr. 9, 1918.

Application filed April 23, 1914. Serial No. 833,926.

*To all whom it may concern:*

Be it known that we, PAUL SCHMIDT and CARL DOBSLAW, citizens of the German Empire, and residing at Berlin, Germany, have invented certain new and useful Improvements in Pocket-Lamps for Firearms, of which the following is a specification.

Our invention relates to electric pocket lamps, and a primary object is to provide an improved pocket lamp adapted to be detachably attached to the barrels of small-arms, particularly small firearms such as pistols, and to be used as a device for lighting the target.

Our improved pocket lamp is of special value to watchmen, policemen and the like who frequently have to enter dark rooms.

It is well-known, for the purpose of aiming accurately in the dark, to mount on the weapon an illuminating aiming-tube which throws a brightly-illuminated mark of any desired form on the dark target. Such illuminating tubes known heretofore have the defect, however, that on the one hand they are always fixedly mounted on the barrel, and on the other hand could not be used as ordinary lamps because the cone of light which was emitted was too small to admit of a room being sufficiently illuminated. Another object of our invention is to obviate this defect by providing two lamps in one case or frame, one of which is provided with a dispersion lens and the other with a system of condensing lenses of the type used in illuminating aiming tubes. Both lamps are fed by one battery and can be connected into circuit either separately or conjointly.

In order to enable the lamp to be readily used on and off the weapon a light sleeve is firmly attached from below to the barrel and is provided with an attachment device, *e. g.* spring-pressed pins, by which the case of the lamp can be readily and rapidly connected with the weapon.

To these ends, our invention consists in the construction, arrangement and combination of parts described hereinafter and pointed out in the claims.

One illustrative embodiment of our invention and modifications of details thereof are represented by way of example in the accompanying drawings, wherein:

Figure 1 is a side elevation from the left-hand showing our improved lamp attached to an automatic pistol; Fig. 2 is a rear elevation of the lamp and its attachment device, Fig. 3 is a like view after the end of the case has been removed, and Figs. 4, 5 and 6 are bottom plan view, side elevation and end elevation, respectively, showing the clamp for attaching the lamp;

Figs. 7, 8 and 9 are like views, respectively, showing a modified form of clamp for attaching the lamp to the pistol;

Fig. 10 is a side elevation of the lamp only as seen from the left showing the form of the upper connecting lug, Fig. 11 is a section through the aiming tube of the lamp, and Figs. 12 and 13 are front and end elevations, respectively, of the battery;

Fig. 14 shows another form of lamp attached to a pistol, Figs. 15 and 16 are side and end elevations, respectively, of the lamp only comprising a rectangular battery and showing the attachment hook, and Figs. 17, 18 and 19 are side elevation, end elevation and top plan view showing the clamp for attaching the lamp to the barrel.

Referring to the drawings, $a$ designates the case of the lamp in which the aiming tube $c$ and the battery $d$ are mounted. This case has a lateral tubular branch $e$ containing an electric lamp and the dispersion lens $g$. The electric incandescent lamp $h$ (Fig. 11) is mounted in the rear of the tube $c$ and illuminates an aiming mark $i$ by means of lens $h'$. At the front end of the tube $c$ there is a condensing lens $h'$ which throws an enlarged image of the aiming mark $i$ on the object. This device is especially adapted for use with firearms as it performs the double function of a pocket-lamp and an aiming-tube. The battery $d$ has three contact lugs $k^1$, $k^2$, $k^3$, the first of which is connected with the metallic case of the lamp. The lamps are screwed into metallic holders in the casing and are thus permanently electrically connected with the lug $k^1$. The two contact lugs or strips $k^2$ and $k^3$ are located a short distance from the end contact pieces of the lamps, so that these lugs can be pressed against these contact pieces by a slight pressure on the studs or buttons $l$, movable in the detachable cover $m$ of the case, whereby the circuits of the lamps are closed. The battery shown in Figs. 12 and 13 comprises three cells arranged in such manner that the battery can partially surround the tube $c$, as shown in Fig. 3.

On the top of the casing is mounted a longitudinal piece of metal $n$ having a lug $o$ in front and recesses or holes $p$ at the rear. The sleeve $q$ has cheeks or lugs $r$, of a form corresponding to the member $n$, between whose front ends is inserted a pin $s$, over which the lug $o$ takes, while the spring-pressed pins $t$ snap into the holes or recesses $p$. The sleeve $q$ is held on the barrel either by the lugs $v$ or by the spring-pressed pins $u$ (Figs. 7 to 9).

As shown in Figs. 14 to 16, in order to prevent the device slipping off the barrel in consequence of severe vibration when firing a number of shots in rapid succession, the casing $a$ of the lamp is preferably fastened by means of a small strip $z$ having a hook $x$ which takes into the guard $y$ of the trigger of the weapon.

As Figs. 17 to 19 show, the sleeve or clamp of the barrel may be provided in front with a snap $w$ which can be folded backward over the sight of the weapon.

We claim:—

1. In an electric pocket lamp, the combination with a casing carrying means for detachably attaching it to a firearm, a dispersion lens mounted therein, and an electric lamp in the casing behind said lens, of a system of condensing lenses mounted in the casing, an electric lamp in the casing behind the condensing lenses, and means for lighting said lamps.

2. In an electric pocket lamp, the combination with a casing carrying means for detachably attaching it to a firearm, a dispersion lens mounted therein, and an electric lamp in the casing behind said lens, of a system of condensing lenses mounted in the casing, an electric lamp in the casing behind the condensing lenses, an electric battery in said casing, and means for electrically connecting said lamps with said battery.

3. In an electric pocket lamp, the combination with a casing, a dispersion lens mounted therein, and an electric lamp in the casing behind said lens, of an aiming tube containing condensing lenses mounted in the casing, an electric lamp in the casing behind the condensing lenses, an electric battery comprising a plurality of cells disposed about said tube in said casing, and means for electrically connecting said lamps with said battery.

4. The combination, with a hand firearm, of an electric pocket lamp detachably attached to the barrel thereof, said pocket lamp comprising a dispersion lens, an electric lamp behind the latter, an aiming tube containing a condensing lens and an electric lamp behind the latter, and means for lighting said lamps.

5. The combination with an electric pocket lamp comprising a casing having an attachment lug, a dispersion lens mounted in the casing, an electric lamp behind the dispersion lens, an aiming tube containing a condensing lens mounted in the casing, an electric lamp behind the condensing lens, and means for lighting said lamps; of a clamp normally detachably attached to said lug and adapted to be detachably attached to the barrel of a firearm.

6. The combination with an electric pocket lamp comprising a casing having a perforated attachment lug, a dispersion lens mounted in the casing, an electric lamp behind the dispersion lens, an aiming tube containing a condensing lens mounted in the casing, an electric lamp behind the condensing lens, and means for lighting said lamps; of a clamp adapted to be detachably attached to the barrel of a firearm, and spring-pressed pins mounted on the clamp and normally taking into the hole in said lug.

7. The combination with an electric pocket lamp comprising a casing having an attachment lug, a dispersion lens mounted in the casing, an electric lamp behind the dispersion lens, an aiming tube containing a condensing lens mounted in the casing, an electric lamp behind the condensing lens, and means for lighting said lamps; of a clamp normally detachably attached to said lug and adapted to be detachably attached to the barrel of a firearm, said clamp carrying a snap adapted to take over a sight on the barrel.

8. The combination with an electric pocket lamp comprising a casing having an attachment lug, a dispersion lens mounted in the casing, an electric lamp behind the dispersion lens, an aiming tube containing a condensing lens mounted in the casing, an electric lamp behind the condensing lens, and means for lighting said lamps; of a clamp normally detachably attached to said lug and adapted to be detachably attached to the barrel of a firearm, and a hook carried by the casing and adapted to engage the guard of the trigger of the firearm.

9. The combination with an electric pocket lamp comprising a casing having an attachment lug, a dispersion lens mounted in the casing, an electric lamp behind the dispersion lens, an aiming tube containing a condensing lens mounted in the casing, an electric lamp behind the condensing lens, and means for lighting said lamps; of a clamp normally detachably attached to said lug and adapted to be detachably attached to the barrel of a fire arm, said clamp comprising end lugs adapted to engage behind the barrel.

In testimony whereof, we affix our signatures in the presence of two witnesses.

PAUL SCHMIDT.
CARL DOBSLAW.

Witnesses:
  WOLDEMAR HAUPT,
  HENRY HASPER.

Copies of this patent may be obtained for five cents each, by addressing the "Commissioner of Patents, Washington, D. C."